(12) United States Patent
Nakajima et al.

(10) Patent No.: US 7,417,081 B2
(45) Date of Patent: Aug. 26, 2008

(54) ASPHALT COMPOSITION

(75) Inventors: Shigeo Nakajima, Fujisawa (JP); Toshinori Shiraki, Yamato (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 367 days.

(21) Appl. No.: 10/512,053

(22) PCT Filed: Apr. 24, 2003

(86) PCT No.: PCT/JP03/05290

§ 371 (c)(1), (2), (4) Date: Oct. 21, 2004

(87) PCT Pub. No.: WO03/091339

PCT Pub. Date: Nov. 6, 2003

(65) Prior Publication Data

US 2005/0171251 A1  Aug. 4, 2005

(30) Foreign Application Priority Data

Apr. 24, 2002 (JP) ............................. 2002-122931
May 9, 2002 (JP) ............................. 2002-134040

(51) Int. Cl.
  *C08L 95/00* (2006.01)
(52) U.S. Cl. ..................................... 524/68
(58) Field of Classification Search .................. 524/68
See application file for complete search history.

(56) References Cited

U.S. PATENT DOCUMENTS

| | | | |
|---|---|---|---|
| 3,281,383 A | 10/1966 | Zelinski et al. | |
| 4,145,322 A | 3/1979 | Maldonado et al. | |
| 4,242,246 A | 12/1980 | Maldonado et al. | |
| 4,501,857 A | 2/1985 | Kishimoto | |
| 4,554,313 A | 11/1985 | Hagenbach et al. | |
| 4,600,749 A | 7/1986 | Minekawa | |
| 4,673,714 A | 6/1987 | Kishimoto | |
| 5,115,035 A | 5/1992 | Shiraki | |
| 5,189,083 A * | 2/1993 | Gelles et al. | 524/68 |
| 5,212,220 A | 5/1993 | Gelles | |
| 5,270,361 A | 12/1993 | Duong et al. | |
| 5,278,207 A * | 1/1994 | Kluttz | 524/68 |
| 5,314,935 A | 5/1994 | Chaverot et al. | |
| 5,322,867 A * | 6/1994 | Kluttz | 524/68 |
| 5,508,112 A | 4/1996 | Planche et al. | |
| 5,527,753 A | 6/1996 | Engel | |
| 5,708,092 A | 1/1998 | Schwindemar | |
| 5,798,401 A | 8/1998 | Korenstra et al. | |
| 5,883,162 A | 3/1999 | Planche et al. | |
| 5,925,695 A | 7/1999 | Ohtsuka et al. | |
| 6,833,411 B2 * | 12/2004 | Fujiwara et al. | 525/240 |
| 7,005,469 B2 * | 2/2006 | Fusamae et al. | 524/495 |
| 7,256,238 B2 * | 8/2007 | Kubo et al. | 525/88 |

FOREIGN PATENT DOCUMENTS

| | | | |
|---|---|---|---|
| EP | 0 174 795 A2 | | 3/1986 |
| GB | 895980 | | 5/1962 |
| GB | 2 241 239 A | | 8/1991 |
| JP | SHO 42-8704 | | 4/1942 |
| JP | 08-109219 | | 4/1996 |
| JP | 10-168323 | | 6/1998 |
| WO | WO 03/008466 | * | 1/2003 |

* cited by examiner

*Primary Examiner*—Peter Szekely
(74) *Attorney, Agent, or Firm*—Finnegan, Henderson, Farabow, Garrett, & Dunner, L.LP.

(57) ABSTRACT

An asphalt composition comprising 0.5 to 50 parts by weight of a block copolymer component (I), 100 parts by weight of an asphalt (II) and 0.01 to 10 parts by weight of at least one vulcanizing agent (III) selected from the group consisting of sulfur and a sulfur-containing compound, wherein the block copolymer component (I) comprises at least one modified block copolymer comprising an unhydrogenated or hydrogenated base block copolymer comprising at least one vinyl aromatic polymer block (A) and at least one conjugated diene polymer block (B), and a functional group-containing modifier group bonded to the base block copolymer.

6 Claims, No Drawings

ASPHALT COMPOSITION

BACKGROUND OF THE INVENTION

1. Field of the Invention

The present invention relates to an asphalt composition. More particularly, the present invention is concerned with an asphalt composition comprising a block copolymer component (I), an asphalt (II) and at least one vulcanizing agent (III) selected from the group consisting of sulfur and a sulfur-containing compound, wherein the block copolymer component (I) comprises at least one modified block copolymer comprising a base block copolymer comprising at least one vinyl aromatic polymer block (A) and at least one conjugated diene polymer block (B), and a functional group-containing modifier group bonded to the base block copolymer. The asphalt composition of the present invention is advantageous not only in that it has a high softening point and excellent properties with respect to ductility, storage stability at high temperatures and flexural properties at low temperatures, but also in that, when the asphalt composition is used in road paving, there can be formed a pavement layer having excellent dynamic stability and excellent aggregate-gripping properties. Therefore, the asphalt composition of the present invention is very suitable for use in road paving. Thus, the asphalt composition of the present invention can be advantageously used as a binder for road paving, especially as a binder for forming a drainage pavement.

2. Prior Art

Conventionally, an asphalt composition has been used in a wide variety of fields, such as the fields of a material for use in road paving, a material for a waterproof sheet, a material for a sound insulating sheet and a roofing material. In these fields, a number of attempts have been made to improve the properties of the asphalt composition by adding various polymers to the asphalt composition. As examples of such polymers, there can be mentioned an ethylene/vinyl acetate copolymer, an ethylene/ethyl acrylate copolymer, a rubber latex, and a block copolymer comprising conjugated diene monomer units and vinyl aromatic hydrocarbon monomer units.

However, in recent years, due to the expansion of traffic and the increase in the number of expressways, there is a growing demand for an asphalt mixture (which is comprised of a plurality of aggregates and an asphalt composition as a binder) having excellent strength and excellent abrasion resistance. Further, there is a growing demand for an asphalt mixture which not only has excellent strength and excellent abrasion resistance, but also can be used to form a highly open graded pavement layer which can improve the drainage properties and noise reduction properties of expressways. For achieving the above-mentioned excellent properties, the asphalt composition is required to have a high softening point and high mechanical strengths (such as high flexural stress and excellent aggregate-gripping properties). For meeting this requirement, it has been attempted, for example, to employ a method in which a block copolymer having a high molecular weight is incorporated into the asphalt composition. However, such method is disadvantageous in that the resultant asphalt composition containing a high molecular weight block copolymer incorporated therein has unsatisfactory storage stability at high temperatures and, hence, its melt viscosity becomes increased under high temperature conditions, thus rendering poor the workability of the asphalt composition during the road paving.

For improving the storage stability of an asphalt composition at high temperatures, it has generally been attempted to add an aromatic process oil to the asphalt composition, or effect a crosslinking of the asphalt composition by the use of sulfur or a peroxide. For example, Examined Japanese Patent Application Publication No. Sho 57-24385 (corresponding to U.S. Pat. No. 4,145,322) discloses a crosslinking using sulfur. On the other hand, Examined Japanese Patent Application Publication No. Hei 1-13743 (corresponding to U.S. Pat. Nos. 4,554,313 and 4,567,222) discloses a crosslinking using a polysulfide having a specific structure. Further, Unexamined Japanese Patent Application Laid-Open Specification No. Hei 3-501035 (corresponding to U.S. Pat. No. 5,508,112) discloses a crosslinking using a combination of sulfur as a vulcanizing agent and a sulfur-containing compound as a vulcanization accelerator. However, any of the above-mentioned techniques is still unsatisfactory in improving the storage stability of an asphalt composition at high temperatures. Also, it has been desired to develop an asphalt composition which not only has excellent storage stability at high temperatures, but also can be used for forming a pavement layer having excellent dynamic stability and excellent aggregate-gripping properties.

SUMMARY OF THE INVENTION

In this situation, the present inventors have made extensive and intensive studies with a view toward solving the above-mentioned problems accompanying the prior art. In their studies, the present inventors have focused on improvement of the properties of an asphalt composition containing an unhydrogenated or hydrogenated block copolymer comprising vinyl aromatic hydrocarbon monomer units and conjugated diene monomer units, and an asphalt. As a result, it has unexpectedly been found that the above objective can be attained by an asphalt composition comprising a block copolymer component (I), an asphalt (II) and at least one vulcanizing agent (III) selected from the group consisting of sulfur and a sulfur-containing compound, wherein the block copolymer component (I) comprises at least one modified block copolymer comprising a base block copolymer comprising at least one vinyl aromatic polymer block (A) and at least one conjugated diene polymer block (B), and a functional group-containing modifier group bonded to the base block copolymer. That is, such asphalt composition has been found to be advantageous not only in that it has a high softening point and excellent properties with respect to ductility, storage stability at high temperatures and flexural properties at low temperatures, but also in that, when the asphalt composition is used in road paving, there can be formed a pavement layer having excellent dynamic stability and excellent aggregate-gripping properties. It has also been found that, when a mixture of specific different block copolymers is used as the block copolymer component (I), the asphalt composition has a good balance of the softening point and the melt viscosity. Based on these novel findings, the present invention has been completed.

Accordingly, it is an object of the present invention to provide an asphalt composition which is advantageous not only in that it has a high softening point and excellent properties with respect to ductility, storage stability at high temperatures and flexural properties at low temperatures, but also in that, when the asphalt composition is used in road paving, there can be formed a pavement layer having excellent dynamic stability and excellent aggregate-gripping properties.

The foregoing and other objects, features and advantages of the present invention will be apparent from the following detailed description and appended claims.

DETAILED DESCRIPTION OF THE INVENTION

According to the present invention, there is provided an asphalt composition comprising:

0.5 to 50 parts by weight of a block copolymer component (I) comprising at least one modified block copolymer comprising:
a base block copolymer comprising at least one vinyl aromatic polymer block (A) composed mainly of vinyl aromatic hydrocarbon monomer units and at least one conjugated diene polymer block (B) composed mainly of conjugated diene monomer units, and
a modifier group bonded to the base block copolymer, the modifier group having at least one functional group,
the base block copolymer being unhydrogenated or hydrogenated,
100 parts by weight of an asphalt (II), and
0.01 to 10 parts by weight of at least one vulcanizing agent (III) selected from the group consisting of sulfur and a sulfur-containing compound.

For easy understanding of the present invention, the essential features and various preferred embodiments of the present invention are enumerated below.

1. An asphalt composition comprising:
0.5 to 50 parts by weight of a block copolymer component (I) comprising at least one modified block copolymer comprising:
a base block copolymer comprising at least one vinyl aromatic polymer block (A) composed mainly of vinyl aromatic hydrocarbon monomer units and at least one conjugated diene polymer block (I) composed mainly of conjugated diene monomer units, and
a modifier group bonded to the base block copolymer, the modifier group having at least one functional group,
the base block copolymer being unhydrogenated or hydrogenated,
100 parts by weight of an asphalt (II), and
0.01 to 10 parts by weight of at least one vulcanizing agent (III) selected from the group consisting of sulfur and a sulfur-containing compound.

2. The asphalt composition according to item 1 above, wherein the block copolymer component (I) is a mixture of:
10 to 90% by weight of a modified block copolymer (I-A) comprising:
a base block copolymer comprising at least two vinyl aromatic polymer blocks (A) and at least one conjugated diene polymer block (B), and
the modifier group bonded to the base block copolymer,
the base block copolymer being unhydrogenated or hydrogenated; and
90 to 10% by weight of at least one block copolymer selected from the group consisting of:
a modified block copolymer (I-B) other than the modified block copolymer (I-A), which comprises:
a base block copolymer comprising at least one vinyl aromatic polymer block (A) and at least one conjugated diene polymer block (B), and
the modifier group bonded to the base block copolymer,
the base block copolymer being unhydrogenated or hydrogenated, and
an unmodified block copolymer (I-C) comprising at least one vinyl aromatic polymer block (A) and at least one conjugated diene polymer block (B), the unmodified block copolymer (I-C) being unhydrogenated or hydrogenated,
wherein each % by weight is based on the weight of the mixture.

3. The asphalt composition according to item 1 or 2 above, wherein the modifier group has at least one functional group selected from the group consisting of the functional groups represented by the following formulae (1) to (14):

  (1)

  (2)

  (3)

  (4)

  (5)

  (6)

  (7)

  (8)

  (9)

  (10)

  (11)

  (12)

  (13)

  (14)

wherein, in formulae (1) to (14):
N represents a nitrogen atom, Si represents a silicon atom, O represents an oxygen atom, C represents a carbon atom, and H represents a hydrogen atom,
each of $R^1$ to $R^4$ independently represents a hydrogen atom or a $C_1$-$C_{24}$ hydrocarbon group which optionally has at least one functional group selected from the group consisting of a hydroxyl group, an epoxy group, an amino group, a silanol group and a $C_1$-$C_{24}$ alkoxysilane group,
each $R^5$ independently represents a $C_1$-$C_{48}$ hydrocarbon group which optionally has at least one functional group selected from the group consisting of a hydroxyl group, an epoxy group, an amino group, a silanol group and a $C_1$-$C_{24}$ alkoxysilane group, and
each $R^6$ independently represents a hydrogen atom or a $C_1$-$C_8$ alkyl group.

4. A method for producing the asphalt composition of any one of items 1 to 3 above, which comprises:
(1) providing a living block copolymer comprising:
a base block copolymer comprising at least one vinyl aromatic polymer block (A) composed mainly of vinyl aromatic hydrocarbon monomer units and at least one conjugated diene polymer block (B) composed mainly of conjugated diene monomer units, and lithium ions bonded to the terminals of the base block copolymer, (2) reacting the living block copolymer with a modifier compound having or being capable of forming at least one functional group, to thereby obtain a modified block copolymer, and (3) adding the obtained modified block copolymer and at least one vulcanizing agent to a molten form of an asphalt while stirring, the at least one vulcanizing agent being selected from the group consisting of sulfur and a sulfur-containing compound.

5. The method according to item 4 above, wherein the modified block copolymer obtained in step (2) is subjected to hydrogenation.

Hereinbelow, the present invention is described in detail.

The block copolymer component (I) used in the asphalt composition of the present invention comprises at least one modified block copolymer comprising:

a base block copolymer comprising at least one vinyl aromatic polymer block (A) composed mainly of vinyl aromatic hydrocarbon monomer units and at least one conjugated diene polymer block (B) composed mainly of conjugated diene monomer units, wherein the base block copolymer is unhydrogenated or hydrogenated, and a modifier group bonded to the base block copolymer, wherein the modifier group has at least one functional group.

The amount of vinyl aromatic hydrocarbon monomer units in the modified block copolymer is generally from 5 to 95% by weight, preferably from 10 to 90% by weight, more preferably from 15 to 85% by weight, based on the weight of the modified block copolymer. It is especially recommended that the amount of vinyl aromatic hydrocarbon monomer units in the modified block copolymer is from 5 to 60% by weight, preferably from 10 to 55% by weight, more preferably from 15 to 50% by weight, based on the weight of the modified block copolymer.

As examples of methods for producing the base block copolymer, there can be mentioned the methods described in Examined Japanese Patent Application Publication Nos. Sho 36-19286 (corresponding to GB No. 895980), Sho 43-17979 (corresponding to U.S. Pat. No. 4,600,749) and Sho 49-36957 (corresponding to U.S. Pat. No. 3,281,383). By any of the methods described in the above-mentioned patent documents, the base block copolymer used in the present invention can be produced in the form of a living block copolymer. By a reaction of the living block copolymer with the below-described modifier compound, the modified block copolymer (having a functional group-containing a modifier group) used in the present invention, can be obtained. The modified block copolymer used in the present invention has, for example, a structure represented by a formula selected from the group consisting of the following formulae:

$(A-B)_n$-Y, A-$(B-A)_n$-Y, B-$(A-B)_n$-Y, Y-$(A-B)_n$, Y-$(A-B)_n$-Y, Y-A-$(B-A)_n$-Y, Y-B-$(A-B)_n$-Y, $[(B-A)_n]_m$-Y, $[(A-B)_n]_m$-Y, $[(B-A)_n$-B$]_m$-Y, and $[(A-B)_n$-A$]_m$-Y.

In the above-mentioned formulae, each A independently represents a vinyl aromatic polymer block (A) composed mainly of vinyl aromatic hydrocarbon monomer units, and each B independently represents a conjugated diene polymer block (B) composed mainly of conjugated diene monomer units. It is not necessary that the boundary between the polymer blocks A and B be distinct. In the above-mentioned formulae, n is an integer of 1 or more, preferably an integer of from 1 to 5, and m is an integer of 2 or more, preferably an integer of from 2 to 11. Each Y independently represents a residue (i.e., modifier group) of the below-described modifier compound which has or is capable of forming at least one functional group. When Y is bonded to the polymer block A and/or B by the below-described method including a metalation reaction, Y is bonded to a side chain of the polymer block A and/or polymer block B. The structures of the polymer chains each having Y bonded thereto are the same or different.

In the present invention, a vinyl aromatic polymer block (A) composed mainly of vinyl aromatic hydrocarbon monomer units is a copolymer block comprising vinyl aromatic hydrocarbon monomer units and conjugated diene monomer units or a homopolymer block comprising vinyl aromatic hydrocarbon monomer units, wherein the amount of vinyl aromatic hydrocarbon monomer units in the copolymer block is 50% by weight or more, preferably 70% by weight or more, based on the weight of the copolymer block. A conjugated diene polymer block (B) composed mainly of conjugated diene monomer units is a copolymer block comprising conjugated diene monomer units and vinyl aromatic hydrocarbon monomer units or a homopolymer block comprising conjugated diene monomer units, wherein the amount of conjugated diene monomer units in the copolymer block is more than 50% by weight, preferably 70% by weight or more, based on the weight of the copolymer block. The vinyl aromatic hydrocarbon monomer units may be uniformly distributed or may be distributed in a tapered configuration in the copolymer block. The copolymer block may have a plurality of segments in which the vinyl aromatic hydrocarbon monomer units are uniformly distributed, and/or may have a plurality of segments in which the vinyl aromatic hydrocarbon monomer units are distributed in a tapered configuration. Further, the copolymer block may have a plurality of segments having different vinyl aromatic hydrocarbon monomer unit contents. The base block copolymer used in the present invention may be a mixture of a plurality of base block copolymers having structures selected from the group consisting of the structures represented by the above-mentioned formulae.

When the base block copolymer in the modified block copolymer has at least one vinyl aromatic hydrocarbon homopolymer block, from the viewpoint of obtaining an asphalt composition having excellent ductility, it is preferred that the ratio of the weight of the at least one vinyl aromatic hydrocarbon homopolymer block to the total weight of the vinyl aromatic hydrocarbon monomer units in the base block copolymer (hereinafter referred to as "vinyl aromatic hydrocarbon block ratio") is controlled in the range of from 50% by weight or more, more advantageously from 50 to 97% by weight, still more advantageously from 60 to 95% by weight. With respect to the weight average molecular weight of the at least one vinyl aromatic hydrocarbon homopolymer block in the base block copolymer, it is recommended that the weight average molecular weight is generally from 5,000 to 500,000, preferably from 7,000 to 200,000. The vinyl aromatic hydrocarbon block ratio of the base block copolymer can be measured by the following method. The weight of the at least one vinyl aromatic hydrocarbon homopolymer block is obtained by, for example, a method in which the unhydrogenated base block copolymer is subjected to oxidative degradation using tert-butyl hydroperoxide in the presence of osmium tetraoxide as a catalyst (i.e., the method described in I. M. KOLTHOFF, et al., J. Polym. Sci. 1, 429 (1946)). Using the obtained weight of the vinyl aromatic hydrocarbon homopolymer block, the vinyl aromatic hydrocarbon block ratio of the base block copolymer is calculated by the below-mentioned formula, with the proviso that, among the polymer chains (formed by the oxidative degradation) corresponding to the vinyl aromatic hydrocarbon homopolymer blocks, the polymer chains having a polymerization degree of about 30 or less are not taken into consideration in the measurement of the vinyl aromatic hydrocarbon block ratio.

Vinyl aromatic hydrocarbon block ratio (% by weight)
={(weight of the at least one vinyl aromatic hydrocarbon homopolymer block in the base block copolymer)/(total weight of the vinyl aromatic hydrocarbon monomer units in the base block copolymer)}×100.

In the present invention, the microstructure (including the amounts of a cis bond, a trans bond, and a vinyl bond) of the conjugated diene monomer units in the base block copolymer can be appropriately controlled by using the below-described polar compound and the like. When 1,3-butadiene is used as the conjugated diene monomer, the 1,2-vinyl bond content is generally in the range of from 5 to 90%, preferably from 10 to 80%. When isoprene or a combination of 1,3-butadiene and isoprene is used as the conjugated diene monomer, the total content of the 1,2-vinyl bond and 3,4-vinyl bond is generally in the range of from 3 to 80%, preferably from 5 to 70%. However, in the case where a hydrogenated block copolymer is used as the base block copolymer, the microstructure of the conjugated diene monomer units in the base block copolymer is controlled to be as follows. When 1,3-butadiene is used as the conjugated diene monomer, the 1,2-vinyl bond content is preferably in the range of from 10 to 80%, more preferably from 25 to 75%. When isoprene or a combination of 1,3-butadiene and isoprene is used as the conjugated diene monomer, the total content of the 1,2-vinyl bond and 3,4-vinyl bond is preferably in the range of from 5 to 70%.

In the present invention, the conjugated diene monomer is a diolefin having a pair of conjugated double bonds. Examples of conjugated diene monomers include 1,3-butadiene, 2-methyl-1,3-butadiene (isoprene), 2,3-dimethyl-1,3-butadiene, 1,3-pentadiene and 1,3-hexadiene. Of these conjugated diene monomers, preferred are 1,3-butadiene and isoprene. These conjugated diene monomers can be used individually or in combination.

Examples of vinyl aromatic hydrocarbon monomers include styrene, o-methylstyrene, p-methylstyrene, p-tert-butylstyrene, 1,3-dimethylstyrene, α-methyl-styrene, vinylnaphthalene and vinylanthracene. Of these vinyl aromatic hydrocarbon monomers, styrene is preferred. These vinyl aromatic hydrocarbon monomers can be used individually or in combination.

In the present invention, a solvent is generally used in the production of the base block copolymer. Examples of solvents include aliphatic hydrocarbons, such as butane, pentane, hexane, isopentane, heptane, octane and isooctane; alicyclic hydrocarbons, such as cyclopentane, methylcyclopentane, cyclohexane, methylcyclohexane and ethylcyclohexane; and aromatic hydrocarbons, such as benzene, toluene, ethylbenzene and xylene. These solvents can be used individually or in combination.

In the production of the base block copolymer, an organolithium compound is used as a polymerization initiator. The organolithium compound used in the present invention is an organic compound having at least one lithium atom in a molecule thereof. Examples of organolithium compounds include ethyllithium, n-propyllithium, isopropyllithium, n-butyllithium, sec-butyllithium, tert-butyllithium, hexamethylenedilithium, butadienyldilithium and isoprenyldilithium. Further examples of organolithium compounds include 1-(t-butoxy)propyllithium which is described in U.S. Pat. No. 5,708,092; a lithium compound which is produced by reacting 1-(t-butoxy)propyllithium with an isoprene monomer which is in an amount of one to several moles per mole of the 1-(t-butoxy)propyllithium, wherein the reaction with isoprene is performed for the purpose of improving the solubility of the 1-(t-butoxy)propyllithium; siloxy group-containing alkyllithiums (such as 1-(t-butyldimethylsiloxy)hexyl-lithium) which are described in GB Patent No. 2,241,239; aminolithium compounds, such as amino group-containing alkyllithiums described in U.S. Pat. No. 5,527,753 and diisopropylaminolithium. The above-mentioned organolithium compounds can be used individually or in combination. In the production of the base block copolymer, all the amount of the organolithium compound may be added at one time, or the organolithium compound may be added portionwise at two or more times.

In the present invention, for controlling the rate of the polymerization reaction for producing the base block copolymer, for changing the microstructure of the conjugated diene segments in the base block copolymer produced, and for adjusting the reactivity ratio of the conjugated diene monomer to the vinyl aromatic hydrocarbon monomer, a polar compound or a randomizing agent may be used. Examples of polar compounds and randomizing agents include ethers, amines, thioethers, phosphines, phosphoramides, a potassium salt or sodium of potassium or sodium. Examples of ethers include dimethyl ether, diethyl ether, diphenyl ether, tetrahydrofuran, diethylene glycol dimethyl ether and diethylene glycol dibutyl ether. Examples of amines include tertiary amines, such as trimethylamine, triethylamine, tetramethylethylenediamine and cyclic tertiary amines. Examples of phosphines and phosphoramides include triphenylphosphine and hexamethylphosphoramide.

In the present invention, the reaction temperature for the copolymerization for producing the base block copolymer is generally in the range of from −10 to 150° C., preferably from 30 to 120° C. The reaction time for the copolymerization varies depending on other conditions, but is generally within 48 hours, preferably from 0.5 to 10 hours. It is preferred that the atmosphere of the copolymerization reaction system is an atmosphere of an inert gas, such as nitrogen gas. With respect to the copolymerization reaction pressure, there is no particular limitation so long as the pressure is sufficient for the monomers and the solvent to maintain a liquid state. However, the copolymerization reaction pressure is generally from 0.1 to 3 MPa, preferably from 0.2 to 2 MPa. Further, care must be taken so as to prevent the intrusion of impurities (such as catalyst and/or the living polymer, into the copolymerization reaction system.

The modified block copolymer used as the component (I) of the asphalt composition of the present invention can be produced, for example, by a method in which a living block copolymer comprising a base block copolymer and lithium ions bonded to the terminals of the base block copolymer is produced by a living anionic polymerization, and the living block copolymer is reacted with a modifier compound having or being capable of forming at least one functional group to obtain a modified block copolymer, optionally followed by partial or complete hydrogenation of the obtained modified block copolymer. The functional group of the modifier compound may be protected by a conventional method. As another method for producing the modified block copolymer used as the component (I) of the asphalt composition, there can be mentioned a method in which a base block copolymer is reacted with an organic alkali metal compound (this reaction is called a "metalation reaction"), thereby obtaining a block copolymer having bonded thereto an alkali metal, followed by a reaction of the obtained block copolymer with a modifier compound. In this method, it is preferred that the base reaction and the subsequent reaction of the block copolymer with the modifier compound are performed.

When the base block copolymer is reacted with a modifier compound to obtain a modified block copolymer having a modifier group, it is possible that a hydroxyl group and an amino group which are contained in the modifier group are converted to organic alkali metal salts thereof, depending on the type of the modifier compound. In such case, the alkali metal salts can be reconverted to a hydroxyl group and an amino group by reacting the alkali metal salts with an active hydrogen-containing compound, such as water or an alcohol.

In the present invention, a modified block copolymer obtained by a reaction of the living block copolymer with the modifier compound may contain an unmodified block copolymer fraction. It is recommended that the amount of such unmodified block copolymer fraction in the modified block copolymer is preferably not more than 70% by weight, more preferably not more than 60% by weight, still more preferably not more than 50% by weight, based on the weight of the modified block copolymer.

It is preferred that the modifier group bonded to the base block copolymer (which is unhydrogenated or hydrogenated) has at least one functional group selected from the group consisting of a hydroxyl group, an epoxy group, an amino group, a silanol group and an alkoxysilane group. By virtue of any of the above-mentioned functional groups, the modified block copolymer has a high affinity for an asphalt, and interactions between the modified block copolymer and the asphalt are effectively caused to occur due to chemical bonds, such as a hydrogen bond between the modified block copolymer and components of the asphalt, thereby exerting the effects aimed at by the present invention.

Examples of modifier groups include those which have at least one functional group selected from the group consisting of the functional groups represented by the following formulae (1) to (14):

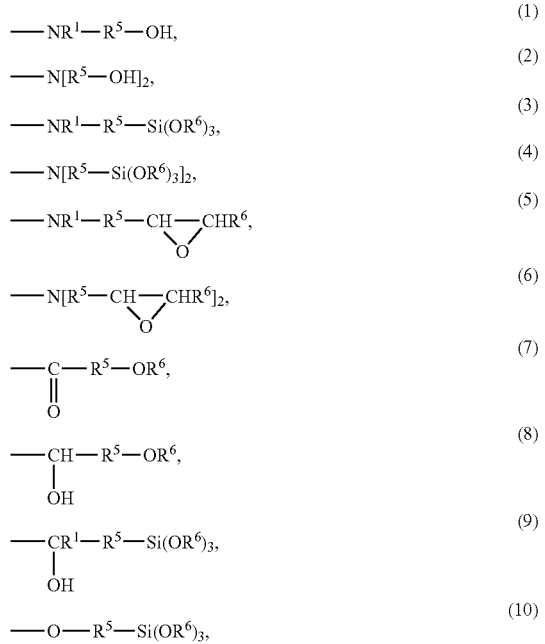

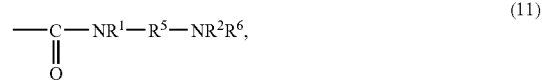

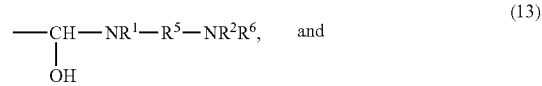

wherein, in the formulae (1) to (14):

N represents a nitrogen atom, Si represents a silicon atom, O represents an oxygen atom, C represents a carbon atom, and H represents a hydrogen atom, each of $R^1$ to $R^4$ independently represents a hydrogen atom or a $C_1$-$C_{24}$ hydrocarbon group which optionally has at least one functional group selected from the group consisting of a hydroxyl group, an epoxy group, an amino group, a silanol group and a $C_1$-$C_{24}$ alkoxysilane group, each $R^5$ independently represents a $C_1$-$C_{48}$ hydrocarbon group which optionally has at least one functional group selected from the group consisting of a hydroxyl group, an epoxy group, an amino group, a silanol group and a $C_1$-$C_{24}$ alkoxysilane group, and each $R^6$ independently represents a hydrogen atom or a $C_1$-$C_8$ alkyl group.

As modifier compounds usable for forming at least one of the above-mentioned modifier groups in the modified block copolymer, there can be mentioned compounds which have or are capable of forming at least one of the above-mentioned functional groups. As examples of such compounds, there can be mentioned the terminal modifiers described in Examined Japanese Patent Application Publication No. Hei 4-39495 (corresponding to U.S. Pat. No. 5,115,035). Specific examples of modifier compounds are enumerated below.

Specific examples of modifier compounds having functional groups represented by the formulae (1) to (6) include tetraglycidyl-m-xylene-diamine, tetraglycidyl-1,3-bisaminomethylcyclohexane, tetraglycidyl-p-phenylenediamine, tetraglycidyldiaminodiphenyl-methane, diglycidylaniline, diglycidyl-o-toluidine, N-(1,3-dibutylbutylidene)-3-triethoxysilyl-1-propaneamine, 4-di(β-trimethoxysilylethyl)aminostyrene, 4-di(β-triethoxysilylethyl)aminostyrene, 4-di(γ-tri-methoxysilylpropyl)aminostyrene, and 4-di(γ-triethoxysilylpropyl)aminostyrene.

Specific examples of modifier compounds having a functional group represented by the formula (7) include cyclic lactones, such as ε-caprolactone, δ-valerolactone, butyrolactone, γ-caprolactone and γ-valerolactone.

Specific examples of modifier compounds having a functional group represented by the formula (8) include 4-methoxybenzophenone, 4-ethoxybenzophenone, 4,4'-bis(methoxy)benzophenone, 4,4'-bis(ethoxy)benzophenone, γ-glycidoxyethyltrimethoxysilane and γ-glycidoxypropyltrimethoxysilane.

Specific examples of modifier compounds having functional groups represented by the formulae (9) and (10) include γ-glycidoxybutyltrimethoxysilane, γ-glycidoxypropyltriethoxysilane, γ-glycidoxypropyltripropoxysilane and γ-glycidoxypropyltributoxysilane.

Further specific examples of modifier compounds having functional groups represented by the formulae (9) and (10) include γ-glycidoxypropyltriphenoxysilane, γ-glycidoxypropylmethyldimethoxysilane, γ-glycidoxypropylethyldimethoxysilane, γ-glycidoxypropylethyldiethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropyldimethylmethoxysilane, γ-glycidoxypropyldiethylethoxysilane and γ-glycidoxypropyldimethylethoxysilane.

Further specific examples of modifier compounds having functional groups represented by the formulae (9) and (10) also include γ-glycidoxypropyldimethylphenoxysilane, γ-glycidoxypropyldiethylmethoxysilane, γ-glycidoxypropylmethyldiisopropeneoxysilane, bis(γ-glycidoxypropyl)dimethoxysilane, bis(γ-glycidoxypropyl)diethoxysilane, bis(γ-glycidoxypropyl)dipropoxysilane, bis(γ-glycidoxypropyl)dibutoxysilane, bis(γ-glycidoxypropyl)diphenoxysilane, bis(γ-glycidoxypropyl)methylmethoxysilane and bis(γ-glycidoxypropyl)methylethoxysilane.

Further specific examples of modifier compounds having functional groups represented by the formulae (9) and (10) also include bis(γ-glycidoxypropyl)methylpropoxysilane, bis(γ-glycidoxypropyl)methylbutoxysilane, bis(γ-glycidoxypropyl)methylphenoxysilane, tris(γ-glycidoxypropyl)methoxysilane, γ-methacryloxypropyltrimethoxysilane, γ-methacryloxypropyltriethoxysilane, γ-methacryloxymethyltrimethoxysilane, γ-methacryloxyethyltriethoxysilane, bis(γ-methacryloxypropyl)dimethoxysilane, tris(γ-methacryloxypropyl)methoxysilane, β-(3,4-epoxycyclohexyl)ethyl-trimethoxysilane and β-(3,4-epoxycyclohexyl)ethyl-triethoxysilane.

Further specific examples of modifier compounds having functional groups represented by the formulae (9) and (10) include:
β-(3,4-epoxycyclohexyl)ethyl-tripropoxysilane,
β-(3,4-epoxycyclohexyl)ethyl-tributoxysilane,
β-(3,4-epoxycyclohexyl)ethyl-triphenoxysilane,
β-(3,4-epoxycyclohexyl)propyl-trimethoxysilane,
β-(3,4-epoxycyclohexyl)ethyl-methyldimethoxysilane,
β-(3,4-epoxycyclohexyl)ethyl-ethyldimethoxysilane,
β-(3,4-epoxycyclohexyl)ethyl-ethyldiethoxysilane,
β-(3,4-epoxycyclohexyl)ethyl-methyldiethoxysilane,
β-(3,4-epoxycyclohexyl)ethyl-methyldipropoxysilane and
β-(3,4-epoxycyclohexyl)ethyl-methyldibutoxysilane.

Further specific examples of modifier compounds having functional groups represented by the formulae (9) and (10) also include:
β-(3,4-epoxycyclohexyl)ethyl-methyldiphenoxysilane,
β-(3,4-epoxycyclohexyl)ethyl-dimethylmethoxysilane,
β-(3,4-epoxycyclohexyl)ethyl-diethylethoxysilane,
β-(3,4-epoxycyclohexyl)ethyl-dimethylethoxysilane,
β-(3,4-epoxycyclohexyl)ethyl-dimethylpropoxysilane,
β-(3,4-epoxycyclohexyl)ethyl-dimethylbutoxysilane,
β-(3,4-epoxycyclohexyl)ethyl-dimethylphenoxysilane,
β-(3,4-epoxycyclohexyl)ethyl-diethylmethoxysilane and
β-(3,4-epoxycyclohexyl)ethyl-methyldiisopropeneoxysilane.

Specific examples of modifier compounds having a functional group represented by the formula (11) include 1,3-dimethyl-2-imidazolidinone and 1,3-diethyl-2-imidazolidinone.

Specific examples of modifier compounds having a functional group represented by the formula (12) include N,N'-dimethylpropyleneurea and N-methylpyrrolidone.

With respect to the modifier compound used for producing the modified block copolymer, it is preferred that the amount of the modifier compound is from 0.5 to 5 equivalents, relative to one equivalent of the living terminals of the base block copolymer. In the present invention, the amount of the living terminals of the base block copolymer can be calculated from the amount of the organolithium compound used in the copolymerization reaction for producing the base block copolymer.

With respect to the conditions under which the base block copolymer is reacted with the modifier compound, there is no particular limitation. However, the reaction temperature is preferably from 0 to 150° C., more preferably from 50 to 100° C., and the reaction pressure is preferably from 0 to 10 kg/cm², more preferably from 1 to 5 kg/cm², in terms of the gauge pressure.

A modified block copolymer having bonded thereto a modifier group which has a functional group represented by the formula (13) can be obtained by hydrogenating a modified block copolymer which is obtained using a modifier compound having a functional group represented by the formula (10). A modified block copolymer having bonded thereto a modifier group which has a functional group represented by the formula (14) can be obtained by hydrogenating a modified block copolymer which is obtained using a modifier compound having a functional group represented by the formula (11).

By reacting the base block copolymer with the modifier compound, a modified block copolymer can be obtained. With respect to the position in the base block copolymer at which the modifier group is bonded to the base block copolymer, there is no particular limitation. However, from the viewpoint of obtaining an asphalt composition having excellent properties at high temperatures, it is preferred that the modifier group is bonded to a vinyl aromatic polymer block (A) of the base block copolymer.

In the present invention, the modified block copolymer containing a hydrogenated base block copolymer can be obtained by partial or complete hydrogenation of the above-obtained modified block copolymer. With respect to the hydrogenation catalyst, there is no particular limitation, and any of the conventional hydrogenation catalysts can be used. Examples of hydrogenation catalysts include:
(1) a carried, heterogeneous hydrogenation catalyst comprising a carrier (such as carbon, silica, alumina or diatomaceous earth) having carried thereon a metal, such as Ni, Pt, Pd or Ru;
(2) the so-called Ziegler type hydrogenation catalyst which uses a transition metal salt (such as an organic acid salt or acetylacetone salt of a metal, such as Ni, Co, Fe or Cr) in combination with a reducing agent, such as an organoaluminum compound; and
(3) a homogeneous hydrogenation catalyst, such as the so-called organometal complex, e.g., an organometal compound containing a metal, such as Ti, Ru, Rh or Zr. Specific examples of hydrogenation catalysts include those which are described in Examined Japanese Patent Application Publication Nos. Sho 42-8704 (corresponding to Canadian Patent No. 815575), Sho 63-4841 (corresponding to U.S. Pat. No. 4,501,857) and Hei 1-37970 (corresponding to U.S. Pat. No. 4,673,714). As preferred examples of hydrogenation catalysts, there can be mentioned a titanocene compound and a mixture of a titanocene compound and a reductive organometal compound.

Examples of titanocene compounds include those which are described in Unexamined Japanese Patent Application Laid-Open Specification No. Hei 8-109219. As specific examples of titanocene compounds, there can be mentioned compounds (e.g., biscyclopentadienyltitanium dichloride and monopentamethylcyclopentadienyltitanium trichloride) which have at least one ligand having a (substituted) cyclopentadienyl skeleton, an indenyl skeleton or a fluorenyl skeleton. Examples of reductive organometal compounds include organic alkali metal compounds, such as an organolithium compound; an organomagnesium compound; an organoaluminum compound; an organoboron compound; and an organozinc compound.

The hydrogenation reaction is performed generally at 0 to 200° C., preferably at 30 to 150° C. It is recommended that the hydrogen pressure in the hydrogenation reaction is in the range of from 0.1 to 15 MPa, preferably from 0.2 to 10 MPa, more preferably from 0.3 to 5 MPa. The hydrogenation reaction time is generally in the range of from 3 minutes to 10 hours, preferably from 10 minutes to 5 hours. The hydrogenation reaction may be performed either in a batchwise manner or in a continuous manner. Further, the hydrogenation reaction may be performed in a manner wherein a batchwise operation and a continuous operation are used in combination.

When the modified block copolymer is subjected to hydrogenation, there is no particular limitation with respect to the hydrogenation ratio as measured with respect to the unsaturated double bonds in the conjugated diene monomer units, and the hydrogenation ratio can be adjusted to a desired level, depending on the desired properties of the asphalt composition. For example, when it is desired to obtain an asphalt composition having excellent heat stability, the hydrogenation ratio is generally 70% or more, preferably 80% or more, more preferably 90% or more. Further, when it is desired to obtain an asphalt composition having excellent heat stability without sacrificing the excellent compatibility between the modified block copolymer and the asphalt, the hydrogenation ratio is preferably from 10% to less than 70%, more preferably from 15% to less than 65%, still more preferably from 20% to less than 60%.

With respect to the hydrogenation ratio as measured with respect to the vinyl bonds in the conjugated diene monomer units, from the viewpoint of obtaining an asphalt composition having excellent heat stability, it is recommended that the hydrogenation ratio is 85% or more, preferably 90% or more, more preferably 95% or more. Herein, the hydrogenation ratio with respect to the vinyl bonds is the percentage of the number of hydrogenated vinyl bonds, based on the number of the vinyl bonds (i.e., the 1,2-vinyl bonds and 3,4-vinyl bonds) in the conjugated diene monomer units of the base block copolymer prior to hydrogenation.

With respect to the hydrogenation ratio as measured with respect to the aromatic double bonds in the vinyl aromatic hydrocarbon monomer units of the base block copolymer, there is no particular limitation. However, it is preferred that the hydrogenation ratio is 50% or less, more advantageously 30% or less, still more advantageously 20% or less.

With respect to the modified block copolymer (which is unhydrogenated or hydrogenated) as the component (I) of the asphalt composition of the present invention, the weight average molecular weight thereof is generally from 30,000 to 1,000,000, preferably from 50,000 to 800,000, more preferably from 70,000 to 600,000. When the weight average molecular weight of the modified block copolymer is smaller than 30,000, the asphalt composition has neither a satisfactorily high softening point nor satisfactorily high mechanical strength. On the other hand, when the weight average molecular weight of the modified block copolymer is larger than 1,000,000, the solubility of the modified block copolymer in the asphalt used in the asphalt composition becomes poor.

In the present invention, the amount of vinyl bonds in the conjugated diene monomer units of a block copolymer can be measured by a method using an infrared spectrophotometer (e.g., the Hampton method) or by a method using a nuclear magnetic resonance (NMR) apparatus. Each of the above-mentioned hydrogenation ratios can also be measured by a method using an infrared spectrophotometer or an NMR apparatus. The weight average molecular weight of a block copolymer (such as a modified block copolymer) can be measured by gel permeation chromatography (GPC) using a calibration curve obtained with respect to commercially available standard monodisperse polystyrene samples.

By the method described hereinabove, a modified block copolymer (which is unhydrogenated or hydrogenated) is obtained in the form of a solution thereof in a solvent. From the obtained solution, the modified block copolymer is separated. If desired, before the separation of the modified block copolymer, a catalyst residue may be separated from the solution. Examples of methods for separating the modified block copolymer from the solution include a method in which a polar solvent (which is a poor solvent for the copolymer), such as acetone or an alcohol, is added to the solution containing the copolymer, thereby precipitating the copolymer, followed by recovery of the copolymer; a method in which the solution containing the copolymer is added to hot water while stirring, followed by removal of the solvent by steam stripping; and a method in which the solution containing the copolymer is directly heated to evaporate the solvent.

In the present invention, the block copolymer component (I) comprising at least one modified block Copolymer (which is unhydrogenated or hydrogenated) may have incorporated therein at least one stabilizer. Examples of stabilizers include phenol type stabilizers, phosphorus type stabilizers, sulfur type stabilizers and amine type stabilizers. The amount of the stabilizer is generally from 0.01 to 5% by weight, based on the weight of the block copolymer component (I).

Examples of phenol type stabilizers include 2,6-di-tert-butyl-4-methylphenol (e.g., "Sumilizer BHT", manufactured and sold by Sumitomo Chemical Co., Ltd., Japan), n-octadecyl-3-(4'-hydroxy-3',5'-di-tert-butylphenyl)propionate (e.g., "Irganox 1076", manufactured and sold by Ciba Specialty Chemicals, U.S.A.), tetrakis(methylene-3-(3',5'-di-tert-butyl-4'-hydroxy-phenyl)propionate)methane (e.g., "Irganox 1010", manufactured and sold by Ciba Specialty Chemicals, U.S.A.), and 2-tert-butyl-6-(3'-tert-butyl-5'-methyl-2'-hydroxy-benzyl)-4-methylphenyl acrylate (e.g., "Sumilizer GM", manufactured and sold by Sumitomo Chemical Co., Ltd., Japan). Examples of phosphorus type stabilizers include tris(nonylphenyl)phosphite (e.g., "Sumilizer TNP", manufactured and sold by Sumitomo Chemical Co., Ltd., Japan) and tris(2,4-di-tert-butylphenyl)phosphite (e.g., "Sumilizer P-16", manufactured and sold by Sumitomo Chemical Co., Ltd., Japan). Examples of sulfur type stabilizers include dilauryl thiodipropionate (e.g., "Sumilizer TPL-R", manufactured and sold by Sumitomo Chemical Co., Ltd., Japan) and pentaerythritoltetrakis(β-lauryl)thiopropionate (e.g., "Sumilizer TP-D", manufactured and sold by Sumitomo Chemical Co., Ltd., Japan). Examples of amine type stabilizers include an alkylated diphenylamine (e.g., "Sumilizer 9A", manufactured and sold by Sumitomo Chemical Co., Ltd., Japan), a mixture containing diallyl-p-phenylenediamine (e.g., "NONFLEX TP-R", manufactured and sold by Seiko Chemical Co., Ltd., Japan), and N-isopropyl-N'-phenyl-p- phenylenediamine (e.g., "NOCRAC 810-NA", manufactured and sold by OUCHISHINKO CHEMICAL INDUSTRIAL CO., LTD., Japan).

In the asphalt composition of the present invention, it is preferred that the block copolymer component (I) is a mixture of:

10 to 90% by weight of a modified block copolymer (I-A) comprising:
a base block copolymer comprising at least two vinyl aromatic polymer blocks (A) and at least one conjugated diene polymer block (B), and
the modifier group bonded to the base block copolymer,
the base block copolymer being unhydrogenated or hydrogenated; and 90 to 10% by weight of at least one block copolymer selected from the group consisting of:
a modified block copolymer (I-B) other than the modified block copolymer (I-A), which comprises:
a base block copolymer comprising at least one vinyl aromatic polymer block (A) and at least one conjugated diene polymer block (B), and
the modifier group bonded to the base block copolymer,
the base block copolymer being unhydrogenated or hydrogenated, and
an unmodified block copolymer (I-C) comprising at least one vinyl aromatic polymer block (A) and at least one conjugated diene polymer block (B), the unmodified block copolymer (I-C) being unhydrogenated or hydrogenated,
wherein each % by weight is based on the weight of the mixture.

The use of the above-mentioned mixture as the block copolymer component (I) of the asphalt composition, is preferred from the viewpoint of obtaining the advantage that the asphalt composition of the present invention can be used to form a pavement layer having excellent dynamic stability and excellent aggregate-gripping properties. The components (I-A) and (I-B) (which are modified block copolymers) are different from each other in the block configuration and/or molecular weight.

With respect to the weight average molecular weights of the components (I-A), (I-B) and (I-C) as measured by GPC using a calibration curve obtained with respect to standard monodisperse polystyrene samples, from the viewpoint of obtaining an asphalt composition exhibiting an excellent balance of the softening point and the anti-phase separation property, it is preferred that each of the weight average molecular weights of the components (I-B) and (I-C) is from 30,000 to 200,000, more advantageously from 35,000 to 180,000, still more advantageously from 40,000 to 150,000, and the weight average molecular weight of the component (I-A) is from 60,000 to 500,000, more advantageously from 80,000 to 400,000, still more advantageously from 100,000 to 350,000.

The above-mentioned block copolymer component (I) which is a mixture of the component (I-A) and at least one component selected from the group consisting of the components (I-B) and (I-C), can be obtained, for example, by a method in which the above-mentioned components are separately produced by the above-described conventional method using an organolithium compound as a polymerization initiator, and the produced components are mixed together. In this method, the weight average molecular weights of the components can be adjusted by appropriately choosing the amount of the organolithium compound used in the production of the components. The mixing of the components can be performed, for example, by the following method. By the above-described conventional method for producing a modified block copolymer, each of the components is individually obtained in the form of a solution thereof in a solvent. A deactivating agent (such as water, an alcohol or an acid) is added to the solutions to deactivate the active species in the solutions. The thus treated solutions are mixed together in a predetermined ratio. From the resultant mixture is removed the polymerization solvent by steam stripping or the like, followed by drying, thereby obtaining a block copolymer mixture as the block copolymer component (I).

Alternatively, the above-mentioned block copolymer component (I) which is a mixture of different modified block copolymers can also be obtained by the following method. The polymerization solvents are separated from the above-mentioned solutions in which the active species have been deactivated, to recover the copolymers, followed by drying to obtain dried copolymers. The dried copolymers are mixed together using a roll or the like to obtain a block copolymer mixture as the block copolymer component (I).

Further, the block copolymer component (I) which is a mixture of the components (I-A) and (I-B), and the block copolymer component (I) which is a mixture of the components (I-A) and (I-C) can be produced by methods other than mentioned above. For example, the block copolymer component (I) which is a mixture of the components (I-A) and (I-C) can be produced, for example, as follows. A living block copolymer having the structure of the block copolymer (I-C) is produced in a polymerization reaction system. Then, to the polymerization reaction system is added a modifier compound in a predetermined amount (for example, in an amount of from 0.5 to 5 equivalents, relative to one equivalent of the living terminals of the living block copolymer), wherein the modifier compound is capable of undergoing a coupling reaction (i.e., there is used a modifier compound having two or more functional groups which contribute to a coupling reaction, wherein the modifier compound is selected from the above-mentioned modifier compounds). By the addition of such modifier compound to the polymerization reaction system, a part of the living block copolymer chains are caused to be bonded to each other through a residue of the modifier compound, thereby forming the block copolymer (I-A). Thereafter, a deactivating agent, such as an alcohol, is added to the polymerization reaction system, thereby obtaining a mixture of the block copolymers (I-A) and (I-C) in a single polymerization reaction system. On the other hand, the block copolymer component (I) which is a mixture of the components (I-A) and (I-B) can be produced, for example, as follows. In a polymerization reaction system, a polymerization reaction is performed in the presence of an organolithium compound as a polymerization initiator to obtain a living block copolymer. Then, the organolithium compound is further added to the polymerization reaction system to continue the polymerization reaction. Thereafter, any of the above-mentioned modifier compounds is added to the polymerization reaction system in a predetermined amount (for example, in an amount of from 0.5 to 5 equivalents, relative to one equivalent of the living terminals of the living block copolymer), thereby obtaining a mixture of the block copolymers (I-A) and (I-B) in a single polymerization reaction system.

With respect to the asphalt used as the component (II) of the asphalt composition of the present invention, explanations are given below.

Examples of asphalts used in the present invention include a petroleum asphalt (i.e., asphalt by-produced by oil refining), natural asphalt, and mixtures thereof with petroleum. Each of the above-mentioned asphalts contains bitumen as the main component thereof. Specific examples of asphalts include a straight asphalt, a semi-blown asphalt, a blown asphalt, tar, pitch, a cutback asphalt (i.e., a mixture of asphalt with oil), and an asphalt emulsion. These asphalts can be used individually or in combination. In the present invention, as a preferred asphalt, there can be mentioned a straight asphalt having a penetration ratio of from 30 to 300, preferably from 40 to 200, more preferably from 45 to 150, wherein the penetration ratio of the asphalt is measured in accordance with JIS K 2207. The amount of the block copolymer component (I) contained in the asphalt composition of the present invention is from 0.5 to 50 parts by weight, preferably from 1 to 30 parts by weight, more preferably from 3 to 20 parts by weight, relative to 100 parts by weight of the asphalt (II).

With respect to the at least one vulcanizing agent (which is selected from the group consisting of sulfur and a sulfur-containing compound) used as the component (III) of the asphalt composition of the present invention, explanations are given below.

Examples of sulfur products used as the vulcanizing agent (III) include a powdery sulfur, a precipitated sulfur, a colloidal sulfur, a surface-treated sulfur, an insoluble sulfur and an inert sulfur. Examples of sulfur-containing compounds used as the vulcanizing agent (III) include sulfur chloride, sulfur dioxide, morpholine disulfide, an alkylphenol disulfide and a high molecular weight polysulfide. A crosslinking accelerator can be used in an appropriate amount in combination with the vulcanizing agent (III). Examples of crosslinking accelerators include a sulfenamide type accelerator, a guanidine type accelerator, a thiuram type accelerator, an aldehyde-amine type accelerator, an aldehyde-ammonia type accelerator, a thiazole type accelerator, a thiourea type accelerator, a dithiocarbamate type accelerator and a xanthate type accelerator. Specific examples of such crosslinking accelerators include a diphenylguanidine, n-butyl aldehyde-anil condensate, a hexamethylenetetramine, 2-mercaptobenzothiazole, N-cyclohexyl-2-benzothiazyl sulfenamide, thiocarbanilide, tetramethylthiuram monosulfide, sodium dimethyl dithiocarbamate and zinc isopropyl xanthogenate. The amount of the vulcanizing agent as the component (III) is in the range of from 0.01 to 10 parts by weight, preferably from 0.02 to 5 parts by weight, more preferably from 0.05 to 2 parts by weight, relative to 100 parts by weight of the asphalt as the component (II). The amount of the crosslinking accelerator is generally in the range of from 0.01 to 10 parts by weight, preferably from 0.02 to 5 parts by weight, more preferably from 0.05 to 2 parts by weight, relative to 100 parts by weight of the asphalt as the component (II). By using the components (I), (II) and (III) and optionally a crosslinking accelerator in the amounts within the above-mentioned ranges, the effects of the present invention can be exerted at a maximum level.

The asphalt composition of the present invention may contain a silane coupling agent. Specific examples of silane coupling agents include bis[3-(triethoxysilyl)propyl]tetrasulfide, bis[3-(triethoxysilyl)propyl]disulfide, bis[2-(triethoxysilyl)ethyl]-tetrasulfide, 3-mercaptopropyl-trimethoxysilane, 3-mercaptopropyl-methyldimethoxysilane, 3-triethoxysilyl-propyl-N,N-dimethylthiocarbamoyltetrasulfide, 3-triethoxysilylpropylbenzothiazoletetrasulfide, vinyltrimethoxysilane, vinyltriethoxysilane, 2-(3,4-epoxycyclohexyl)ethyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2(aminoethyl)3-aminopropylmethyldimethoxysilane, N-2(aminoethyl)3-aminopropyltrimethoxysilane, N-2 (aminoethyl)3-aminopropyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane and 3-isocyanatepropyltriethoxysilane.

As a preferred example of the silane coupling agent, there can be mentioned a compound having a polysulfide linkage containing a silanol group or an alkoxysilane in combination with two or more sulfur atoms, wherein any of the sulfur atoms may be present in the form of a mercapto group. Specific examples of such preferred silane coupling agents include bis[3-(triethoxysilyl)propyl]tetrasulfide, bis[3-(triethoxysilyl)propyl]disulfide, bis[2-(triethoxysilyl)ethyl]-tetrasulfide, 3-mercaptopropyl-trimethoxysilane, 3-mercaptopropyl-methyldimethoxysilane, 3-triethoxysilylpropyl-N,N-dimethylthiocarbamoyltetrasulfide and 3-triethoxysilylpropylbenzothiazoletetrasulfide. It is recommended that the amount of the silane coupling agent is from 0.01 to 20 parts by weight, preferably from 0.05 to 10 parts by weight, more preferably from 0.1 to 5 parts by weight, relative to 100 parts by weight of the asphalt as the component (II).

From the viewpoint of obtaining excellent aggregate-gripping properties, the asphalt composition of the present invention may contain a surfactant, such as an anionic surfactant, a cationic surfactant or a nonionic surfactant. Specific examples of surfactants include a higher fatty acid having 11 or more carbon atoms (e.g., stearic acid, oleic acid, linoleic acid or linolenic acid) and a metal salt thereof, a monoamine, a diamine, a polyamine and a co-oligomer of polyethylene oxide and polypropylene oxide. Further examples of surfactants include an acidic, organic phosphate compound; a mixture of an acidic, organic phosphate compound and an inorganic phosphate compound; a polycarboxylic acid and an anhydride thereof; an aliphatic phosphate; a phosphoric acid ester with a higher alcohol (e.g., stearyl phosphate); a mixture of a higher alcohol and a phosphorylated alcohol; gallic acid and derivatives thereof; fatty acids derived from a tall oil, and derivatives thereof; a condensate of polyalkylenepolyamine and a fatty acid; a liquid epoxy; a graft-modified polyethylene obtained by grafting maleic anhydride onto polyethylene; a graft-modified polypropylene obtained by grafting maleic anhydride onto polypropylene; a graft-modified styrene/butadiene block copolymer obtained by grafting maleic anhydride onto a styrene/butadiene block copolymer, and a hydrogenation product thereof; and a hydrogenation product of a graft-modified styrene/isoprene block copolymer which is obtained by grafting maleic anhydride onto a styrene/isoprene block copolymer.

If desired, the asphalt composition of the present invention may contain any of the conventional additives. With respect to the type of the additive, there is no particular limitation so long as it is an additive which is generally used in combination with a thermoplastic resin or a rubbery copolymer. Examples of additives include those which are described in "Gomu Purasuchikku Haigou Yakuhin (Additives for Rubber and Plastic)" (published by Rubber Digest Co., Ltd., Japan (1968)). Specific examples of additives include inorganic fillers, such as calcium carbonate, magnesium carbonate, magnesium hydroxide, calcium sulfate, barium sulfate, silica, clay, talc, mica, wollastonite, montmorillonite, zeolite, alumina, titanium oxide, magnesium oxide, zinc oxide, a slag wool and a glass fiber; pigments, such as carbon black and an iron oxide; lubricants, such as stearic acid, behenic acid, zinc stearate, calcium stearate, magnesium stearate and ethylenebisstearoamide; mold release agents; softening agents and plasticizers, such as a paraffinic process oil, a naphthenic process oil, an aromatic process oil, a paraffin, an organic polysiloxane and a mineral oil; antioxidants, such as a hindered phenol type antioxidant and a phosphorus type thermal stabilizer; hindered amine type light stabilizers; benzotriazole type ultraviolet absorbers; flame retardants; antistatic agents; reinforcing agents, such as an organic fiber, a glass fiber, a carbon fiber and a metal whisker; coloring agents; and mixtures thereof. With respect to the amount of the additive, there is no particular limitation; however, the amount of the additive is generally 50 parts by weight or less, relative to 100 parts by weight of the modified block copolymer.

With respect to the method for producing the asphalt composition of the present invention, there is no particular limitation. For example, the asphalt composition can be produced by a method which comprises:

(1) providing a living block copolymer comprising:
a base block copolymer comprising at least one vinyl aromatic polymer block (A) composed mainly of vinyl aromatic hydrocarbon monomer units and at least one conjugated diene polymer block (B) composed mainly of conjugated diene monomer units, and
lithium ions bonded to the terminals of the base block copolymer, (2) reacting the living block copolymer with a modifier compound having or being capable of forming at least one functional group, to thereby obtain a modified block copolymer, and (3) adding the obtained modified block copolymer and at least one vulcanizing agent to the molten form of an asphalt while stirring, the at least one vulcanizing agent being selected from the group consisting of sulfur and a sulfur-containing compound.

With respect to the substances used in the method for producing the asphalt composition (i.e., the living block copolymer, the modifier compound, the vulcanizing agent, the asphalt and the like), the methods for producing the substances and the types and amounts of the substances are as described above in connection with the asphalt composition of the present invention.

With respect to the conditions under which a mixture of the modified block copolymer, the vulcanizing agent and the asphalt is stirred, there is no particular limitation. However, the stirring temperature is preferably in the range of from 160 to 200° C., more preferably about 180° C., and the stirring time is preferably in the range of from 30 minutes to 6 hours, more preferably from 2 to 3 hours. Further, the stirring rate varies depending on the apparatus used, but is generally from 100 to 8,000 rpm.

If desired, the modified block copolymer obtained in the above-mentioned step (2) may be subjected to hydrogenation. The method for hydrogenation is as described above in connection with the asphalt composition of the present invention.

The asphalt composition of the present invention can be advantageously used in road paving. Especially, by virtue of the excellent properties of the asphalt composition with respect to dynamic stability and aggregate-gripping properties, the asphalt composition of the present invention can be advantageously used as a binder for a drainage pavement for various roads, such as a road having a large traffic, an expressway, and a road segment at which the load of traffic tends to concentrate (e.g., an intersection or a curving road).

A drainage pavement comprises a road and, formed thereon, a drainage pavement layer having a plurality of voids for drainage, wherein the drainage pavement layer is an asphalt mixture comprised of a plurality of aggregates and an asphalt composition as a binder.

When the asphalt composition of the present invention is used as a binder in a drainage pavement, the drainage pavement exhibits excellent properties with respect to, e.g., rutting resistance, water permeability, traffic noise reduction properties and low-temperature properties (e.g., crack resistance at low temperatures). The asphalt composition of the present invention can also be used for forming a permeable pavement, which is required to have the same functions as those of a drainage pavement.

Generally, an asphalt pavement is formed by the following method. To a mixture of a coarse aggregate (e.g., crushed stone), a fine aggregate (e.g., sand or crushed sand), stone dust and the like (wherein the mixture has an appropriate range of particle size distribution) is added an asphalt composition (as a binder) which is heated, thereby obtaining an asphalt mixture. The obtained asphalt mixture is spread over a road, and the resultant asphalt mixture layer on the road is rolled flat by using a roller or the like, thereby obtaining an asphalt pavement. The drainage pavement layer of a drainage pavement has an extremely large number of intercommunicating voids for drainage, as compared to the number of voids in the pavement layer of a conventional pavement produced using a conventional asphalt mixture. By virtue of such property, the drainage pavement exhibits excellent functions, e.g., the drainability for preventing the occurrence of rain pools, the ability to ensure safe driving by preventing a continuous water thin layer from being formed by rain on the road, and the ability to reduce traffic noise (e.g., an exhaust noise or a noise caused by the contact between rotating tires and the road surface). The asphalt composition of the present invention can be advantageously used for forming a drainage pavement wherein the drainage pavement layer has a void ratio of from 5 to 35%, preferably from 10 to 30%, more preferably from 12 to 28%.

The void ratio of a drainage pavement layer is defined by the following formula:

$$\text{Void ratio}(\%) = \frac{V_v}{V} \times 100 = \left[1 - \frac{\rho_m}{D}\right] \times 100$$

wherein:

$\rho_m$ represents the density (g/cm$^3$) of the asphalt mixture (which is comprised of a plurality of aggregates and an asphalt composition), V represents the volume (cm$^3$) of the asphalt mixture, $V_v$ represents the void volume (cm$^3$) of the asphalt mixture, and D represents the theoretical maximum density (g/cm$^3$) of the asphalt mixture.

BEST MODE FOR CARRYING OUT THE INVENTION

Hereinbelow, the present invention will be described in more detail with reference to the following Examples and Comparative Examples, which should not be construed as limiting the scope of the present invention.

The properties of unhydrogenated or hydrogenated block copolymers and of asphalt compositions were determined by the following methods.

1. Properties of Block Copolymers (Such as Modified Block Copolymers)

(1) Styrene Content:

The absorption intensity of a block copolymer at 262 nm was measured using an ultraviolet spectrophotometer (trade name: UV200; manufactured and sold by Hitachi, Ltd., Japan), and the styrene content was calculated therefrom.

(2) Vinyl Bond Content and Hydrogenation Ratio:

The vinyl bond content and hydrogenation ratio were measured by means of a nuclear magnetic resonance (NMR) apparatus (trade name: DPX-400; manufactured and sold by BRUKER, Germany).

(3) Weight Average Molecular Weight:

The weight average molecular weight was measured by gel permeation chromatography (GPC) using a GPC apparatus (manufactured and sold by Waters Corporation, U.S.A.) and a column packed with a polystyrene gel (Shodex, manufactured and sold by Showa Denko Co., Japan), under conditions wherein tetrahydrofuran was used as a solvent and the measuring temperature was 35° C. In the measurement of the weight average molecular weight, there was used a calibration curve obtained with respect to commercially available standard monodisperse polystyrene samples.

(4) Amount of the Unmodified Block Copolymer Fraction in a Modified Block Copolymer:

A sample solution was prepared by mixing together 20 ml of tetrahydrofuran, 10 mg of the modified block copolymer and 10 mg of a low molecular weight internal standard polystyrene having a weight average molecular weight of 8,000. The sample solution was subjected to gel permeation chromatography (GPC) in substantially the same manner as in item (3) above, thereby obtaining a chromatogram. From the chromatogram, the ratio (a) of the peak area of the modified block copolymer to the peak area of the internal standard polystyrene was determined. On the other hand, the same sample solution as mentioned above was subjected to gel permeation chromatography (GPC) in substantially the same manner as in item (3) above, except that there were used a GPC apparatus (Zorbax, manufactured and sold by DuPont, U.S.A) and a column packed with a silica gel. The silica gel adsorbs the modified block copolymer fraction but does not adsorb the unmodified block copolymer fraction. From the resultant chromatogram, the ratio (b) of the peak area of the block copolymer (i.e., unmodified block copolymer fraction) to the peak area of the internal standard polystyrene was determined.

The ratio (a) reflects the total peak area ascribed to both the unmodified block copolymer fraction and the modified block copolymer fraction, and the ratio (b) reflects the peak area ascribed to only the unmodified block copolymer fraction. Therefore, from the ratio (a) and the ratio (b), the amount of the unmodified block copolymer fraction in the modified block copolymer was obtained.

2. Production of Block Copolymers (Such as Modified Block Copolymers)

The hydrogenation catalyst used in hydrogenation reactions was prepared by the following method.

A reaction vessel was purged with nitrogen. To the reaction vessel were added two liters of dried, purified cyclohexane. Then, 40 mmol of bis($\eta^5$-cyclopentadienyl)titaniumdi(p-tolyl) and 150 g of a 1,2-polybutadiene having a weight average molecular weight of about 1,000 and a 1,2-vinyl bond content of about 85% were added to and dissolved in the cyclohexane, thereby obtaining a solution. A cyclohexane solution of 60 mmol of n-butyllithium was added to the solution in the reaction vessel, and a reaction was performed at room temperature for 5 minutes, and then 40 mmol of n-butanol was immediately added to the reaction vessel while stirring, thereby obtaining a hydrogenation catalyst. The obtained hydrogenation catalyst was preserved at room temperature.

a. Polymer 1

An autoclave equipped with a stirrer and a jacket was washed, dried and purged with nitrogen. To the autoclave was added a cyclohexane solution of 15 parts by weight of purified styrene (styrene concentration: 20% by weight). Tetramethylethylenediamine and, then, n-butyllithium were added to the autoclave, wherein the amount of the tetramethylethylenediamine was 0.1 mole per mole of the n-butyllithium, and the amount of the n-butyllithium was 0.135 part by weight, relative to 100 parts by weight of the total of the monomers used in the production of the polymer 1. Then, a polymerization reaction was performed at 70° C. for 1 hour. Subsequently, a cyclohexane solution of 70 parts by weight of purified butadiene (butadiene concentration: 20% by weight) was added to the autoclave, and a polymerization reaction was performed at 70° C. for 1 hour. Thereafter, a cyclohexane solution of 15 parts by weight of purified styrene was added to the autoclave, and a polymerization reaction was performed at 70° C. for 1 hour, thereby obtaining a living block copolymer.

The obtained living block copolymer was reacted with 1,3-dimethyl-2-imidazolidinone as a modifier compound (hereinafter, this modifier compound is referred to as "modifier compound M1"), wherein the modifier compound was used in an amount equimolar to the n-butyllithium which was used above. To the resultant reaction mixture were added methanol and, then, octadecyl-3-(3,5-di-t-butyl-4-hydroxyphenyl)propionate as a stabilizer wherein the amount of the stabilizer was 0.3 part by weight, relative to 100 parts by weight of the above-obtained living block copolymer, thereby obtaining a modified block copolymer (polymer 1).

The obtained polymer 1 had a styrene content of 30% by weight, a styrene block ratio of 95% by weight, a vinyl bond content of 15%, and a weight average molecular weight of 110,000. Further, the amount of the unmodified block copolymer fraction in the polymer 1 was 25% by weight, based on the weight of the polymer 1.

b. Polymer 2

Substantially the same procedure as in the production of the polymer 1 was repeated except that no modifier compound was used, thereby obtaining an unmodified block copolymer (polymer 2).

c. Polymer 3

An autoclave equipped with a stirrer and a jacket was washed, dried and purged with nitrogen. To the autoclave was added a cyclohexane solution of 30 parts by weight of purified styrene (styrene concentration: 20% by weight). Tetramethylethylenediamine and, then, n-butyllithium were added to the autoclave, wherein the amount of the tetramethylethylenediamine was 0.1 mol per mol of the n-butyllithium, and the amount of the n-butyllithium was 0.1 part by weight, relative to 100 parts by weight of the total of the monomers used in the production of the polymer 3. Then, a polymerization reaction was performed at 70° C. for 1 hour. Subsequently, a cyclohexane solution of 70 parts by weight of purified butadiene (butadiene concentration: 20% by weight) was added to the autoclave, and a polymerization reaction was performed at 70° C. for 1 hour, thereby obtaining a living block copolymer.

The obtained living block copolymer was reacted with tetraglycidyl-1,3-bisaminomethylcyclohexane as a modifier compound (hereinafter, this modifier compound is referred to as "modifier compound M2"), wherein the modifier compound was used in an amount of ¼ mole, relative to the mole of the n-butyllithium which was used above. To the resultant reaction mixture were added methanol and, then, octadecyl- 3-(3,5-di-t-butyl-4-hydroxyphenyl)propionate as a stabilizer wherein the amount of the stabilizer was 0.3 part by weight, relative to 100 parts by weight of the above-obtained living block copolymer, thereby obtaining a modified block copolymer (polymer 3).

The obtained polymer 3 had a styrene content of 30% by weight, a styrene block ratio of 100% by weight, a vinyl bond content of 17%, and a weight average molecular weight of 440,000. Further, the amount of the unmodified block copolymer fraction in the polymer 3 was 30% by weight, based on the weight of the polymer 3.

d. Polymer 4

A modified block copolymer in the form of a solution thereof was produced in substantially the same manner as in the production of the polymer 1, except that the amount of tetramethylethylenediamine was changed so that the modified block copolymer had a vinyl bond content of 35%. To the solution of the modified block copolymer was added the above-mentioned hydrogenation catalyst in an amount of 100 ppm by weight, in terms of the amount of titanium, based on the weight of the modified block copolymer, and a hydrogenation reaction was performed under conditions wherein the hydrogen pressure was 0.7 MPa and the temperature was 65° C. After completion of the hydrogenation reaction, methanol was added to the resultant reaction mixture, followed by addition of, as a stabilizer, octadecyl-3-(3,5-di-t-butyl-4-hydroxyphenyl)propionate in an amount of 0.3 part by weight, relative to 100 parts by weight of the modified block copolymer, thereby obtaining a hydrogenated, modified block copolymer (polymer 4).

The obtained polymer 4 had a hydrogenation ratio of 98%. Further, the amount of the unmodified block copolymer fraction in the polymer 4 was 30% by weight, based on the weight of the polymer 4.

e. Polymer 5

A living block copolymer was produced in substantially the same manner as in the production of the polymer 1. To the produced living block copolymer was added γ-glycidoxypropyltriethoxysilane as a modifier compound (hereinafter, this modifier compound is referred to as "modifier compound M3") in an amount equimolar to the n-butyllithium used in the production of the living block copolymer, thereby obtaining a modified block copolymer in the form of a solution thereof.

To the solution of the modified block copolymer was added the above-mentioned hydrogenation catalyst in an amount of 100 ppm by weight, in terms of the amount of titanium, based on the weight of the modified block copolymer, and a hydrogenation reaction was performed under conditions wherein the hydrogen pressure was 0.7 MPa and the temperature was 65° C., thereby obtaining a reaction mixture containing a hydrogenated, modified block copolymer (polymer 5) having a hydrogenation ratio of about 35%. After completion of the hydrogenation reaction, methanol was added to the reaction mixture, followed by addition of, as a stabilizer, octadecyl-3-(3,5-di-t-butyl-4-hydroxyphenyl)propionate in an amount of 0.3 part by weight, relative to 100 parts by weight of the modified block copolymer. The amount of the unmodified block copolymer fraction in the polymer 5 was 30% by weight, based on the weight of the polymer 5.

f. Polymer 6

An autoclave equipped with a stirrer and a jacket was washed, dried and purged with nitrogen. To the autoclave was added a cyclohexane solution of 19 parts by weight of purified styrene (styrene concentration: 20% by weight). Tetramethylethylenediamine and, then, n-butyllithium were added to the autoclave, wherein the amount of the tetramethylethylenediamine was 0.1 mole per mole of the n-butyllithium, and the amount of the n-butyllithium was 0.079 part by weight, relative to 100 parts by weight of the total of the monomers used in the production of the polymer 6. Then, a polymerization reaction was performed at 70° C. for 1 hour. Subsequently, a cyclohexane solution of 45 parts by weight of purified butadiene (butadiene concentration: 20% by weight) was added to the autoclave, and a polymerization reaction was performed at 70° C. for 1 hour. Thereafter, to the autoclave was added n-butyllithium in an amount of 0.043 part by weight, relative to 100 parts by weight of the total of the monomers used in the production of the polymer 6. Then, to the autoclave was added a cyclohexane solution of 25 parts by weight of purified butadiene (butadiene concentration: 20% by weight), and a polymerization reaction was performed at 70° C. for 1 hour. Further, a cyclohexane solution of 11 parts by weight of purified styrene (styrene concentration: 20% by weight) was added to the autoclave, and a polymerization reaction was performed at 70° C. for 1 hour, thereby obtaining a living block copolymer.

The obtained living block copolymer was reacted with the above-mentioned modifier compound M1, wherein the modifier compound Ml was used in an amount equimolar to all of the n-butyllithium which was used above in the production of the living block copolymer. To the resultant reaction mixture were added methanol and, then, octadecyl-3-(3,5-di-t-butyl-4-hydroxyphenyl)-propionate as a stabilizer in an amount of 0.3 part by weight, relative to 100 parts by weight of the living block copolymer, thereby obtaining a modified block copolymer (polymer 6).

The obtained polymer 6 had a styrene content of 30% by weight, a styrene block ratio of 94% by weight, and a vinyl bond content of 15%. Also, the polymer 6 was comprised of 74 parts by weight of a fraction having a peak molecular weight of 153,000 and 26 parts by weights of a fraction having a peak molecular weight of 65,000, wherein the peak molecular weights were as measured by GPC using a calibration curve obtained with respect to standard monodisperse polystyrene samples. Further, the amount of the unmodified block copolymer fraction in the polymer 6 was 30% by weight, based on the weight of the polymer 6.

g. Polymer 7

Substantially the same procedure as in the production of the polymer 6 was repeated except that no modifier compound was used, thereby obtaining an unmodified block copolymer (polymer 7).

3. Production of Asphalt Compositions 400 g of straight asphalt 60-80 (manufactured and sold by NIPPON OIL COMPANY, LIMITED, Japan) was added to a metal can having a volume of 750 ml. The metal can containing the straight asphalt was put into an oil bath having a temperature of 180° C. so that the straight asphalt was satisfactorily heated, thereby melting the asphalt. Then, to the resultant molten asphalt were added a predetermined amount of a block copolymer and optionally a predetermined amount of sulfur bit by bit while stirring. After completion of the addition of a block copolymer and optional sulfur, the resultant mixture was stirred at a revolution rate of 5,000 rpm for 90 minutes, thereby obtaining an asphalt composition.

4. Properties of Asphalt Compositions (1) Softening Point (Ring-and-Ball Method)

The softening point of the asphalt composition was measured in accordance with JIS K 2207. Specifically, the ring of a ring-and-ball apparatus as defined in JIS K 2207 is filled with a sample of the asphalt composition. The ring-and-ball apparatus is immersed in glycerol, and the ring is maintained level in the glycerol. Then, a ball having a weight of 3.5 g is placed at the center of the ring filled with the sample. The temperature of the glycerol is elevated at a rate of 5° C./min, so as to soften the sample gradually. The central portion of the softening sample is gradually sagged under the weight of the ball, and the temperature (softening point) at which the sagged central portion of the sample reaches a bottom plate placed below the ring is measured.

(2) Melt Viscosity

The melt viscosity was measured by means of a Brookfield viscometer at 180° C.

(3) Penetration Ratio

The penetration ratio of the asphalt composition was measured in accordance with JIS K 2207. Specifically, a sample of the asphalt composition is placed in a thermostatic water bath, and the temperature of the sample is maintained at 25° C. Then, a prescribed needle is caused to penetrate into the sample for 5 seconds. The distance over which the needle has penetrated into the sample is measured, and is defined as the penetration ratio.

(4) Elongation

The elongation of the asphalt composition was measured in accordance with JIS K 2207. Specifically, a sample of the asphalt composition is poured into a mold to shape the sample into a prescribed-form. Then, the shaped sample is placed in a thermostatic water bath, and the temperature of the sample is maintained at 4° C. Then, the sample is pulled at a rate of 5 cm/min until it is broken, and the elongation of the sample at the time of breakage is measured.

(5) Adhesion Strength

The adhesion strength of the asphalt composition was measured by the following method. The asphalt composition is dissolved in toluene, and the resultant solution is coated onto a canvas using a coater. The coated canvas is dried, first at room temperature for 1 hour, and then at 70° C. in an oven for 7 minutes, thereby completely evaporating the toluene from the coated canvas. Subsequently, the coated canvas is placed in an oven together with a granite (as an adherend) having a smooth surface, and the coated canvas and the granite are heated at 70° C. for 1 hour. Then, the coated canvas and the granite are taken out from the oven and rapidly pressed onto each other twice using a roller under a load of 1 kg, thereby adhering the coated canvas onto the granite. The resultant structure in which the coated canvas is adhered onto the granite, is placed in a thermostatic chamber at a temperature of 23° C., and a peeling test (peeling angle: 180°) in which the canvas is peeled off from the granite is performed to measure the adhesion strength of the asphalt composition.

(6) Flexural Properties at Low Temperatures

The flexural stress of the asphalt composition was measured by the following method. The asphalt composition is poured into a mold having a size of 20 mm×20 mm×120 mm, and the excess asphalt composition (i.e., the portion of the asphalt composition which is above the upper end of the mold) is cut off. The mold containing the asphalt composition is placed in a cryostat, and the asphalt composition in the mold is maintained at −20° C. for 4 hours or more. Then, the resultant molded product of the asphalt composition is rapidly taken out from the mold, and is measured with respect to the flexural stress by a method in which the molded product is supported at two points thereof which are at a distance (span) of 80 mm from each other, and a load is applied, at a loading rate of 100 mm/min, to a portion of the molded product which is at a middle of the 80 mm span.

(7) High-Temperature Storage Stability

The high temperature storage stability of the asphalt composition was evaluated by the following method. An aluminum can having an inner diameter of 50 mm and a height of 130 mm is filled up with the asphalt composition immediately after the production thereof. The aluminum can containing the asphalt composition is placed in an oven and heated at 180° C. for 24 hours. The aluminum can is taken out from the oven and allowed to stand so that the asphalt composition in the aluminum can cools to room temperature. As samples, upper and lower portions of the resultant solidified asphalt composition, which are a 4 cm-thick lower layer at a lower end portion and a 4 cm-thick upper layer at an upper end portion, are taken by cutting. The softening points of both the samples are measured. The difference in softening point between the samples is used as a yardstick for the high temperature storage stability of the asphalt composition.

5. Properties of a Drainage Pavement Mixture

An aggregate comprising approximately 85% by weight of crushed stone No. 6, approximately 10% by weight of crushed sand and approximately 5% by weight of stone dust was produced, wherein the composition of the aggregate was chosen so as to have a void ratio of approximately 20%. The aggregate was heated to 170° C. To the heated aggregate was added 5% by weight, based on the weight of the aggregate, of a molten form of an asphalt composition (as a binder), followed by mixing well at 170° C., thereby obtaining a drainage pavement mixture having a void ratio of approximately 20%. With respect to the obtained mixture, the below-mentioned properties were measured.

(1) Wheel Tracking Test (Yardstick for Dynamic Stability)

The wheel tracking test for evaluating the dynamic stability of the drainage pavement mixture was performed in accordance with the method described in "Hosou Shikenhou Binran Bessatsu (Zantei Shikenhouhou) (Handbook of Pavement Test Method: separate volume (interim test method)", published by the Japan Road Association Corporation, Japan. The test was performed at 60±0.5° C.

(2) Cantabro Test (Yardstick for Aggregate-Gripping Properties)

The Cantabro test for measuring the Cantabro loss ratio of the drainage pavement mixture was performed in accordance with the method described in "Hosou Shikenhou Binran Bessatsu (Zantei Shikenhouhou) (Handbook of Pavement Test Method: separate volume (interim test method)", published by the Japan Road Association Corporation, Japan. The curing of the drainage pavement mixture was performed at 0° C. and the test was performed at 18° C.

EXAMPLES 1 TO 3 AND COMPARATIVE EXAMPLES 1 TO 5

Asphalt compositions were produced in accordance with the formulations indicated in Table 1 (the polymer 1 or 2 was used as a block copolymer). Specifically, the production of each asphalt composition was performed as follows.

400 g of straight asphalt 60-80 (manufactured and sold by NIPPON OIL COMPANY, LIMITED, Japan) was added to a metal can having a volume of 750 ml. The metal can containing the straight asphalt was put into an oil bath having a temperature of 180° C. so that the straight asphalt was satisfactorily heated, thereby melting the asphalt. Then, to the resultant molten asphalt were added a predetermined amount of a block copolymer and optionally a predetermined amount of sulfur (trade name: GOLDEN FLOWER SULFUR POWDER; manufactured and sold by Tsurumi Chemical Co., Japan) bit by bit while stirring. After completion of the addition of a block copolymer and optional sulfur, the resultant mixture was stirred at a revolution rate of 5,000 rpm for 90 minutes, thereby obtaining an asphalt composition. The properties of the obtained asphalt composition are shown in Table 1.

EXAMPLE 7 AND COMPARATIVE EXAMPLE 6 AND 7

Asphalt compositions were produced in substantially the same manner as in Example 1, except that the formulations as indicated in Table 3 below were used. The properties of the asphalt compositions are shown in Table 3.

TABLE 1

| | | Ex. 1 | Ex. 2 | Ex. 3 | Comp. Ex. 1 | Comp. Ex. 2 | Comp. Ex. 3 | Comp Ex. 4 | Comp. Ex. 5 |
|---|---|---|---|---|---|---|---|---|---|
| Block copolymer | | Polymer 1 | Polymer 1 | Polymer 1 | Polymer 1 | Polymer 1 | Polymer 1 | Polymer 1 | Polymer 2 |
| Amount of block copolymer (parts by weight) | | 8 | 3 | 20 | 0.3 | 60 | 8 | 8 | 8 |
| Amount of asphalt (parts by weight) | | 100 | 100 | 100 | 100 | 100 | 100 | 100 | 100 |
| Amount of sulfur (parts by weight) | | 0.2 | 4 | 0.05 | 5 | 0.2 | 0 | 12 | 0.2 |
| Softening point (° C.) | | 95 | 87 | 99 | 54 | Not measurable due to high viscosity | 84 | Not measurable due to high viscosity | 85 |
| Melt viscosity (cP) | | 580 | 420 | 595 | 250 | | 410 | | 460 |
| Penetration ratio (1/10 mm) | | 40 | 42 | 57 | 58 | | 35 | | 40 |
| Elongation (cm) | | 81 | 80 | 88 | 12 | | 92 | | 75 |
| Adhesion strength (gf/10 mm) | | 4,800 | 4,010 | 5,200 | 150 | | 2,920 | | 3,200 |
| Flexural stress (N/mm$^2$) | | 10.7 | 9.2 | 12.8 | 3.6 | | 8.2 | | 8.7 |
| High temperature storage stability | Difference in softening point (° C.) | 17 | 17 | 20 | 10 | Not measurable due to high viscosity | 22 | Not measurable due to high viscosity | 23 |

Using individually the asphalt compositions produced in Example 1, Comparative Example 3 and Comparative Example 5, drainage pavement mixtures were produced. The properties of the drainage pavement mixtures are shown in Table 2 below.

As seen from Table 2, a drainage pavement mixture produced using the asphalt composition of the present invention exhibits excellent dynamic stability and excellent aggregate-gripping properties. Therefore, the asphalt composition of the present invention can be advantageously used for forming an asphalt pavement.

TABLE 2

| | | Example 1 | Comparative Example 3 | Comparative Example 5 |
|---|---|---|---|---|
| Properties of drainage pavement mixture | Dynamic stability (pass/mm) | 10,400 | 8,200 | 8,200 |
| | Cantabro loss ratio (%) | 12 | 18 | 22 |

EXAMPLES 4 TO 6

Drainage pavement mixtures were produced in substantially the same manner as in Example 1, except that, in stead of the polymer 1, the polymers 3, 4 and 5 were used in Examples 4, 5 and 6, respectively. The drainage pavement mixtures produced in these Examples 4 to 6 exhibited excellent dynamic stability and excellent aggregate-gripping properties.

TABLE 3

| | Example 7 | Comparative Example 6 | Comparative Example 7 |
|---|---|---|---|
| Block copolymer | Polymer 6 | Polymer 6 | Polymer 7 |
| Amount of block copolymer (parts by weight) | 8 | 8 | 8 |
| Amount of asphalt (parts by weight) | 100 | 100 | 100 |
| Amount of sulfur (parts by weight) | 0.2 | 0 | 0 |
| Softening point (° C.) | 102 | 96 | 98 |
| Melt viscosity (cP) | 540 | 420 | 430 |
| Penetration ratio (1/10 mm) | 42 | 48 | 44 |
| Elongation (cm) | 86 | 78 | 79 |
| Adhesion strength (gf/10 mm) | 5,300 | 4,700 | 3,500 |
| Flexural stress (N/mm$^2$) | 7.3 | 6.1 | 6.4 |
| High temperature storage stability Difference in softening point (° C.) | 16 | 18 | 25 |

INDUSTRIAL APPLICABILITY

The asphalt composition of the present invention is advantageous not only in that it has a high softening point and excellent properties with respect to ductility, storage stability at high temperatures and that, when the asphalt composition is used in road paving, there can be formed a pavement layer having excellent dynamic stability and excellent aggregate-gripping properties. Therefore, the asphalt composition of the present invention is very suitable for use in road paving. Thus, the asphalt composition of the present invention can be advantageously used as a binder for road paving, especially as a binder for forming a drainage pavement.

The invention claimed is:

1. An asphalt composition comprising:
   0.5 to 50 parts by weight of a block copolymer component (I) comprising at least one terminal-modified block copolymer comprising:
   a base block copolymer comprising at least one vinyl aromatic polymer block (A) composed mainly of vinyl aromatic hydrocarbon monomer units and at least one conjugated diene polymer block (B) composed mainly of conjugated diene monomer units, and
   a modifier group bonded to a terminal of said base block copolymer, said modifier group having at least one functional group selected from the group consisting of a hydroxyl group, an epoxy group, an amino group, a silanol group and an alkoxysilane group,
   said base block copolymer being unhydrogenated or hydrogenated,
   100 parts by weight of an asphalt (II), and
   0.01 to 10 parts by weight of at least one vulcanizing agent (III) selected from the group consisting of sulfur and a sulfur-containing compound.

2. The asphalt composition according to claim 1, wherein said block copolymer component (I) is a mixture of:
   10 to 90% by weight of a terminal-modified block copolymer (I-A) comprising:
   a base block copolymer comprising at least two vinyl aromatic polymer blocks (A) and at least one conjugated diene polymer block (B),
   said modifier group being bonded to a terminal of the base block copolymer, and
   said base block copolymer being unhydrogenated or hydrogenated; and
   90 to 10% by weight of at least one block copolymer selected from the group consisting of:
   a terminal-modified block copolymer (I-B) other than said terminal-modified block copolymer (I-A), which comprises:
   a base block copolymer comprising at least one vinyl aromatic polymer block (A) and at least one conjugated diene polymer block (B),
   said modifier group being bonded to a terminal of the base block copolymer, and
   said base block copolymer being unhydrogenated or hydrogenated, and
   an unmodified block copolymer (I-C) comprising at least one vinyl aromatic polymer block (A) and at least one conjugated diene polymer block (B), said unmodified block copolymer (I-C) being unhydrogenated or hydrogenated,
   wherein each % by weight is based on the weight of said mixture.

3. The asphalt composition according to claim 1 or 2, wherein said modifier group has at least one functional group selected from the group consisting of the functional groups represented by the following formulae (1) to (14):

 (1)

 (2)

 (3)

 (4)

-continued

 (5)

 (6)

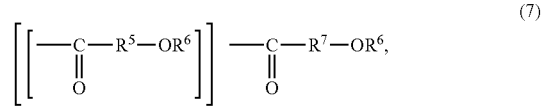 (7)

 (8)

 (9)

 (10)

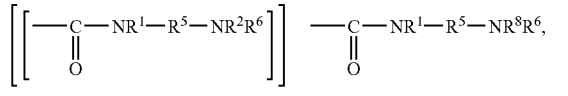 (11)

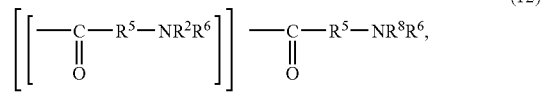 (12)

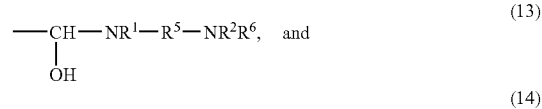 (13)

 (14)

wherein, in the formulae (1) to (14):
N represents a nitrogen atom, Si represents a silicon atom, O represents an oxygen atom, C represents a carbon atom, and H represents a hydrogen atom,
each of $R^1$ to $R^4$ independently represents a hydrogen atom or a $C_1$-$C_{24}$ hydrocarbon group which optionally has at least one functional group selected from the group consisting of a hydroxyl group, an epoxy group, an amino group, a silanol group and a $C_1$-$C_{24}$ alkoxysilane group,
each $R^5$ independently represents a $C_1$-$C_{48}$ hydrocarbon group which optionally has at least one functional group selected from the group consisting of a hydroxyl group, an epoxy group, an amino group, a silanol group and a $C_1$-$C_{24}$ alkoxysilane group,
each $R^6$ independently represents a hydrogen atom or a $C_1$-$C_8$ alkyl group,
$R^7$ represents a $C_1$-$C_{48}$ hydrocarbon group which has at least one functional group selected from the group consisting of a hydroxyl group, an epoxy group, an amino group, a silanol group and a $C_1$-$C_{24}$ alkoxysilane group, and
each $R^8$ indeDendently represents a hydrogen atom or a $C_1$-$C_{24}$ hydrocarbon group.

4. A method for producing the asphalt composition of claim 1 or 2, which comprises:
   (1) providing a living block copolymer comprising:
   a base block copolymer comprising at least one vinyl aromatic polymer block (A) composed mainly of vinyl aromatic hydrocarbon monomer units and at least one conjugated diene polymer block (B) composed mainly of conjugated diene monomer units, and lithium ions bonded to the terminals of said base block copolymer, (2) reacting said living block copolymer with a modifier compound having or being capable of forming at least one functional group, selected from the group consisting of a hydroxyl group, an epoxy group, an amino group, a silano group and an alkoxysilane group, to thereby obtain a terminal-modified block copolymer, and (3) adding the obtained terminal-modified block copolymer and at least one vulcanizing agent to a molten form of an asphalt while stirring, said at least one vulcanizing agent being selected from the group consisting of sulfur and a sulfur-containing compound.

5. The method according to claim 4, wherein said terminal-modified block copolymer obtained in step (2) is subjected to hydrogenation.

6. The asphalt composition according to claim 1, wherein said modifier group is bonded to said at least one vinyl aromatic polymer block (A) of said base block copolymer.

* * * * *